Figure 1:
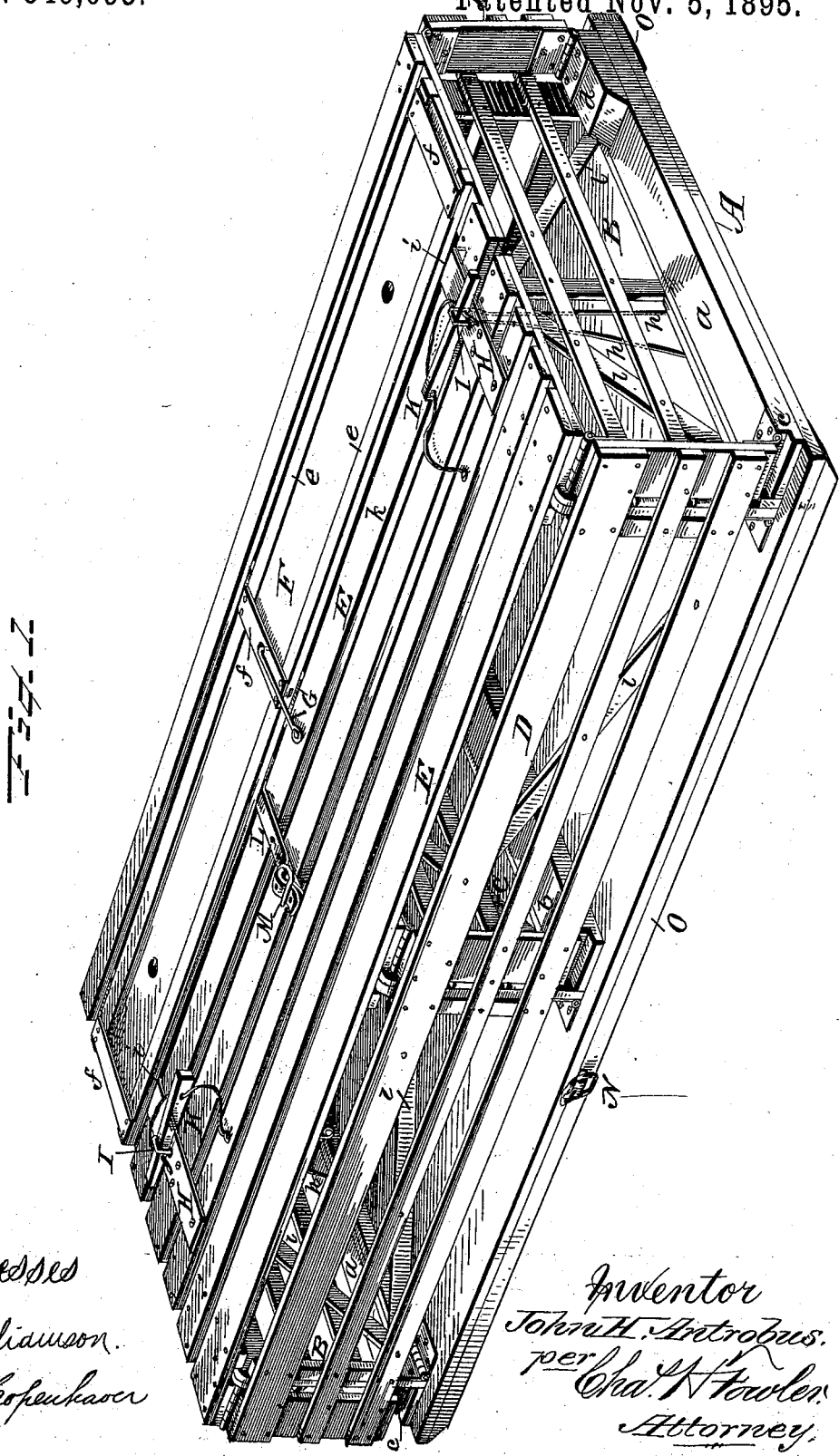

(No Model.)
2 Sheets—Sheet 1.

J. H. ANTROBUS.
POULTRY CRATE.

No. 549,095. Patented Nov. 5, 1895.

Witnesses
J. H. Williamson.
G. M. Copenhaver

Inventor
John H. Antrobus.
per Chas. H. Fowler
Attorney.

(No Model.) 2 Sheets—Sheet 2.

J. H. ANTROBUS.
POULTRY CRATE.

No. 549,095. Patented Nov. 5, 1895.

Witnesses
C. J. Williamson
G. M. Copenhaver

Inventor
John H. Antrobus,
per Chas. N. Fowler
Attorney.

UNITED STATES PATENT OFFICE.

JOHN H. ANTROBUS, OF OTTUMWA, IOWA.

POULTRY-CRATE.

SPECIFICATION forming part of Letters Patent No. 549,095, dated November 5, 1895.

Application filed August 20, 1895. Serial No. 559,915. (No model.)

*To all whom it may concern:*

Be it known that I, JOHN H. ANTROBUS, a citizen of the United States, residing at Ottumwa, in the county of Wapello and State of Iowa, have invented certain new and useful Improvements in Poultry-Crates; and I do hereby declare that the following is a full, clear, and exact description of the same, reference being had to the annexed drawings, making a part of this specification, and to the letters of reference marked thereon.

The present invention has for its object to provide a strong and durable crate for poultry that can be readily and conveniently folded over and upon itself into a small compass when not required for use, in order to economize space for packing and transhipment, and the hinged or folding sections easily extended and held together when in use as a crate.

The invention consists of a crate constructed substantially as shown in the drawings, and hereinafter described and claimed.

Figure 2:
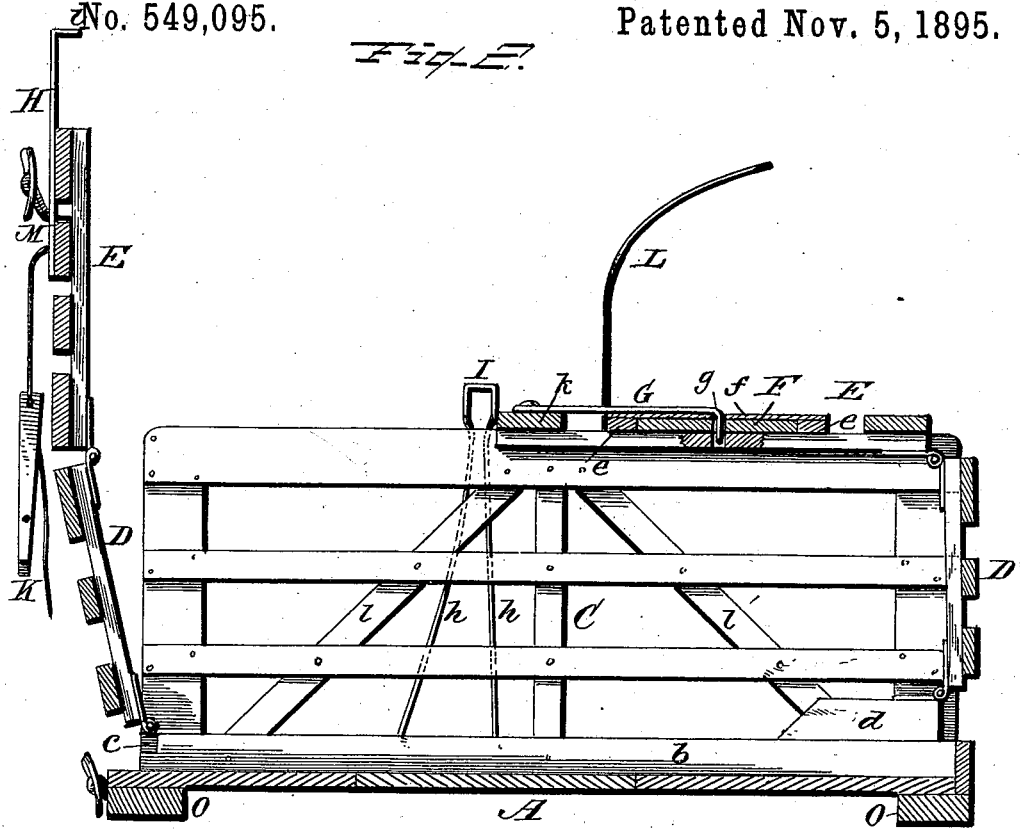
Figure 3:
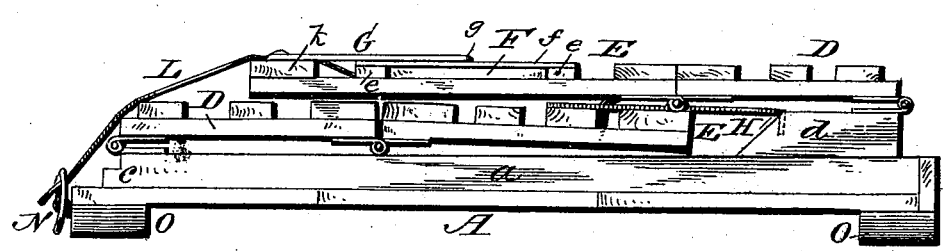

Figure 1 of the drawings is a perspective view of a crate constructed in accordance with my invention and ready for use. Fig. 2 is a sectional end view of Fig. 1, showing one of the hinged side sections disconnected and in a raised position. Fig. 3 is an end view showing the crate in a folded position.

In the accompanying drawings, A represents the bottom or base of the poultry-crate, which may be of any suitable size and shape and of any desirable thickness.

Upon the upper side and ends of the bottom or base A are secured cleats $a$, and at or near the center of said bottom or base is a similar cleat $b$. These cleats form braces or stops to the end sections B and the central section C, the latter-named section dividing the crate into two separate compartments, as shown in Fig. 1 of the drawings, or by allowing the central section to remain resting upon the bottom or base a single-compartment crate is provided to adapt itself to the uses to which the crate may be applied or the kind of poultry it is to carry.

The end or transverse sections B C are hinged to the upper side of the bottom or base A of the crate, and when in an upright position rest against the cleats $a$ $b$.

Each side of the crate and one-half of the top are formed by the two-hinged sections D E, and like the sections B C are constructed of longitudinal slats as the most preferable means of forming the sections, although wire-netting may be used or a suitable netting combined with the slats, as found most convenient, as I do not wish to confine myself to any particular manner of forming the hinged sections, as any of the well-known means of construction may be resorted to without departing from the principle of my invention.

One of the sections D, which form the side of the crate, is hinged directly to the ends of the cleats $a$ $b$, which ends are rabbeted, as shown at $c$, to enable the side sections to be brought to a horizontal position when the crate is to be cleaned or for any other purpose found necessary.

The opposite one of the sections D is hinged directly to blocks $d$ instead of to the ends of the cleats, thus elevating the section on a higher plane, so as to enable it to fold over on top of the opposite sections, as clearly shown in Fig. 3 of the drawings, thus folding into a small compass convenient for transportation or packing away when not required for use.

One of the top sections E may be provided with a slide F, of any suitable construction, whereby access may be obtained to the interior of the crate for any purpose, such as supplying the crate with poultry or removing the poultry therefrom, said slide extending the entire length of the crate and held in position by the parallel guides $e$ and transverse plates $f$.

The slide F is locked by means of a spring-wire latch G, its hooked end $g$ engaging a hole in one of the transverse plates $f$ and a hole in the slide.

To release the slide the wire latch must be raised at its hooked end sufficient to disengage it from the holes in the plate and slide, when the latter may be moved along the necessary distance to form an opening in the crate for the purpose of removing the poultry and supplying the crate therewith.

After the hinged end or transverse sections B C are brought to an upright position the side section D, which is hinged to the blocks $d$, is brought to a similar position, and the top section E, which is hinged to the section D, is brought over to a horizontal position. (Indicated in Fig. 2 of the drawings.)

The two hinged sections above described will be in the position to form one of the sides of the crate and one-half of the top, and the opposite hinged sections D E are brought to the position shown in Fig. 2, and then the latter section brought to a horizontal position to complete the top of the crate, as shown in Fig. 1. The section E, which is last brought into position, is provided with hasps H near the ends of said section, which engage with spring-wire loops I. These loops have wire arms $h$, which extend down to the bottom of the end sections B and are suitably fastened thereto, the arms giving increased strength to the loops and preventing them from being pulled out.

To prevent any strain upon the loops by the hinged section E, the hasps H are provided at their ends with flanges $i$, which catch over the end slat $k$ of the opposite hinged section E. After the hasps engage with the wire loops suitable tapering keys K may be inserted through the loops above the hasps to hold them together.

One of the hinged top sections E is provided with a leather strap L and the opposite top section is provided with a buckle M, so that when the several hinged sections are extended to form a crate the sections E may be further secured together by means of the strap and buckle, as shown in Fig. 1 of the drawings.

When the crate is folded in compact form, as shown in Fig. 3 of the drawings, the strap L is made to engage with a buckle N on the bottom or base A of the crate, thereby holding the hinged sections together.

The central transverse section C of the crate is a decided advantage where it is considered necessary to keep separate a certain class of poultry while being transported.

The flanged ends of the hasps H are considered of importance in holding the two hinged top sections securely together.

To the under side of the bottom A of the crate are secured suitable supporting-cleats O, and the end and side sections B D are provided with diagonal braces $l$ to give strength to the sections and prevent the longitudinal slats thereof from springing, thereby materially increasing the durability of the crate.

Having now fully described my invention, what I claim as new, and desire to secure by Letters Patent, is—

1. A poultry-crate consisting of a bottom or base having transverse cleats connected to its upper side, said cleats being rabbeted at one end and having blocks connected to its opposite ends, end sections and a central section hinged to the bottom or base near the cleats, and double hinged sections forming the sides and top, said side sections being hinged respectively to the rabbeted ends of the cleats and to the blocks, and means for fastening the hinged top sections together, consisting of hasps having flanged ends connected to one of said sections, loops engaging with the hasps and keys engaging with the loops, substantially as and for the purpose set forth.

2. A poultry crate consisting of a suitable bottom or base, hinged end sections and a central hinged section to divide the crate into two compartments, double hinged sections connected to the bottom or base and forming the sides and top of the crate, means for securing the sections together, and a slide held in position by longitudinal and parallel guides connected by transverse plates, and means for locking the slide, consisting of a spring latch having a hooked end engaging with a hole in the plate and slide, substantially as and for the purpose set forth.

In testimony that I claim the above I have hereunto subscribed my name in the presence of two witnesses.

JOHN H. ANTROBUS.

Witnesses:
U. A. COOK,
W. W. EPPS.